United States Patent
Baek

(10) Patent No.: US 11,783,768 B2
(45) Date of Patent: Oct. 10, 2023

(54) POWER SUPPLY DEVICE SUPPLYING SUB-DRIVING VOLTAGE TO DISPLAY DEVICE DURING ABNORMAL OPERATION

(71) Applicant: Samsung Display Co., Ltd., Yongin-si (KR)

(72) Inventor: Eun Ryeol Baek, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/736,622

(22) Filed: Jan. 7, 2020

(65) Prior Publication Data
US 2020/0219440 A1    Jul. 9, 2020

(30) Foreign Application Priority Data
Jan. 8, 2019 (KR) .................. 10-2019-0002428

(51) Int. Cl.
*G09G 3/3208* (2016.01)
*H02M 1/36* (2007.01)
*H02M 3/07* (2006.01)

(52) U.S. Cl.
CPC ............ *G09G 3/3208* (2013.01); *H02M 1/36* (2013.01); *G09G 2310/08* (2013.01); *G09G 2330/021* (2013.01); *G09G 2380/10* (2013.01); *H02M 3/07* (2013.01)

(58) Field of Classification Search
CPC .......... G09G 3/30; G09G 3/32; G09G 3/3208; G09G 3/3216; G09G 3/3225; G09G 3/36; G09G 3/3622; G09G 3/3625; G09G 2330/021; G09G 2330/022; G09G 2330/027; G09G 2330/04; H02M 1/36

USPC ....................... 345/76–83, 87–104
See application file for complete search history.

(56) References Cited

U.S. PATENT DOCUMENTS

| | | | |
|---|---|---|---|
| 8,035,633 B2 | 10/2011 | Park | |
| 9,058,773 B2 | 6/2015 | Park | |
| 9,298,288 B2 | 3/2016 | Park | |
| 2002/0105490 A1* | 8/2002 | Kanbe ............... | G09G 3/3648 345/87 |
| 2003/0109243 A1* | 6/2003 | Chang ................ | G06F 1/30 455/343.1 |
| 2005/0094180 A1* | 5/2005 | Nishimoto ......... | G03G 15/5004 358/1.13 |
| 2007/0035183 A1* | 2/2007 | Shimizu ............. | H02J 9/061 307/126 |
| 2007/0230225 A1* | 10/2007 | Tsukamoto ....... | H02J 13/00004 363/65 |
| 2008/0209237 A1* | 8/2008 | Kim .................. | G06F 1/30 713/300 |

(Continued)

FOREIGN PATENT DOCUMENTS

| | | |
|---|---|---|
| JP | 2011-110942 A | 6/2011 |
| KR | 10-0805547 B1 | 2/2008 |

(Continued)

*Primary Examiner* — Ke Xiao
*Assistant Examiner* — Nelson Lam
(74) *Attorney, Agent, or Firm* — Lewis Roca Rothgerber Christie LLP

(57) ABSTRACT

A power supply may include a power converter configured to supply a driving voltage to a display panel. The power converter may also include a sub-power unit configured to supply a sub-driving voltage to the display panel when the power converter operates abnormally.

15 Claims, 7 Drawing Sheets

(56) References Cited

U.S. PATENT DOCUMENTS

| | | | | |
|---|---|---|---|---|
| 2008/0244296 A1* | 10/2008 | Kangas | ............... | G06F 1/30 |
| | | | | 713/330 |
| 2011/0163695 A1* | 7/2011 | Schmid | ............... | H02J 1/14 |
| | | | | 315/307 |
| 2011/0260538 A1* | 10/2011 | Huang | ............... | H02J 9/062 |
| | | | | 307/64 |
| 2011/0282512 A1* | 11/2011 | Shimizu | ............ | H04N 1/00885 |
| | | | | 700/297 |
| 2011/0310647 A1* | 12/2011 | Humphrey | ......... | H02M 3/1584 |
| | | | | 363/126 |
| 2013/0031386 A1* | 1/2013 | Tanaka | ............ | G06F 1/3265 |
| | | | | 713/300 |
| 2013/0062949 A1* | 3/2013 | Yan | ............... | H02J 9/061 |
| | | | | 307/64 |
| 2014/0340382 A1* | 11/2014 | Sawabe | ............ | G09G 3/3614 |
| | | | | 345/212 |
| 2015/0115799 A1* | 4/2015 | Oh | ............... | G09G 3/3208 |
| | | | | 315/120 |
| 2018/0053463 A1 | 2/2018 | Kong et al. | | |
| 2019/0334373 A1* | 10/2019 | Jang | ............... | G09G 5/00 |

FOREIGN PATENT DOCUMENTS

| | | |
|---|---|---|
| KR | 10-2014-0020483 A | 2/2014 |
| KR | 10-2018-0021358 A | 3/2018 |

\* cited by examiner

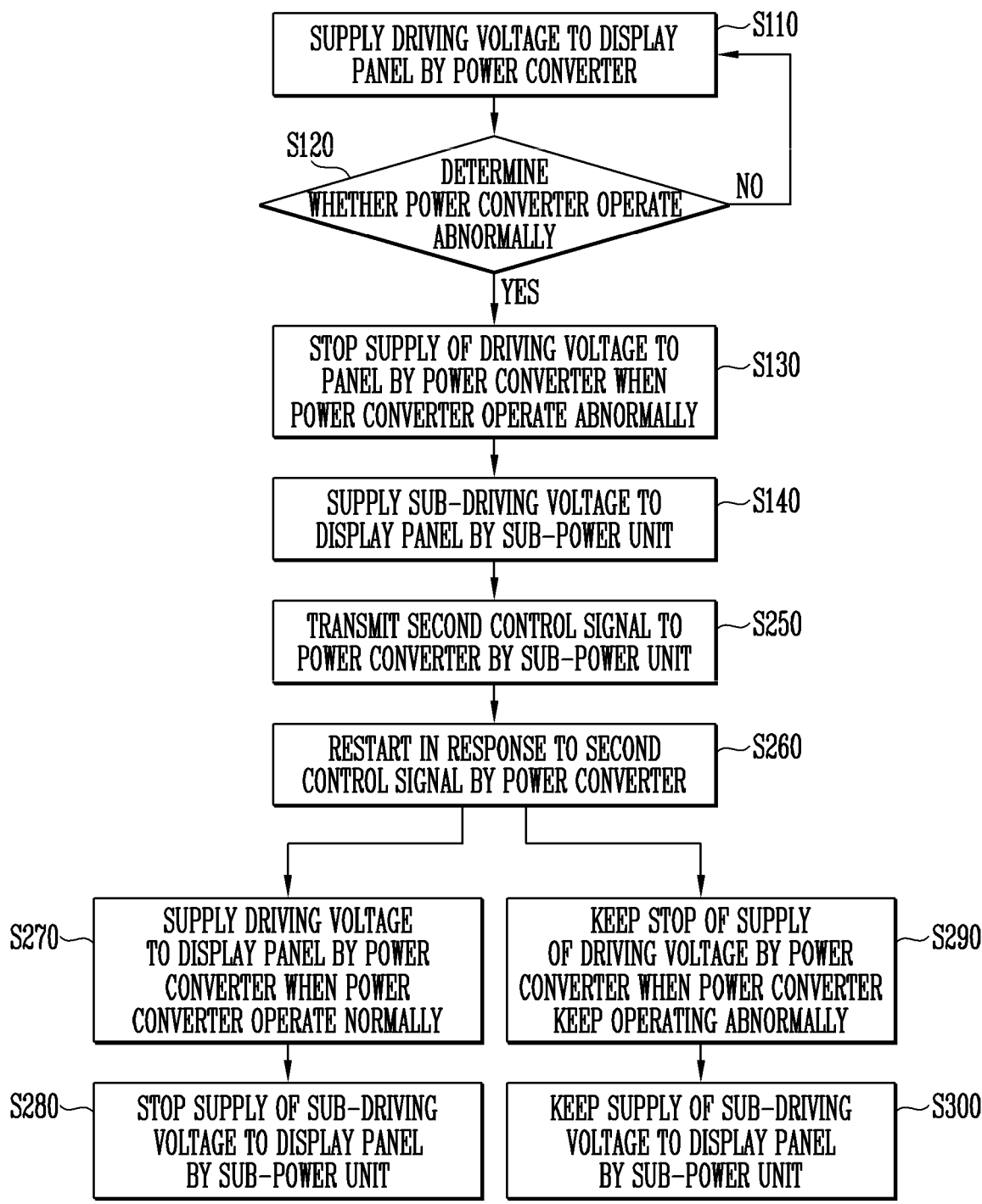

POWER SUPPLY DEVICE SUPPLYING SUB-DRIVING VOLTAGE TO DISPLAY DEVICE DURING ABNORMAL OPERATION

CROSS-REFERENCE TO RELATED APPLICATION

This application claims priority to and the benefit of Korean Patent Application No. 10-2019-0002428 filed in the Korean Intellectual Property Office on Jan. 8, 2019, the entire contents of which are incorporated herein by reference.

BACKGROUND

1. Field

The present invention relates to a power supply device, a display device including the same and a power supply method.

2. Description of the Related Art

In general, a display device includes a power supply device such as a power management IC (PMIC) that converts main power of the display device to a stable driving voltage for the display panel and provides the stable driving voltage to the display panel. The stable driving voltage is provided by the power supply device to the display panel where it is supplied to a plurality of pixels included in the display panel, thereby allowing the plurality of pixels to emit light.

The power supply device may include a power converter that generates a driving voltage and transmits the driving voltage to the display panel. The power converter supplies the driving voltage to the plurality of pixels of the display panel through a driving voltage line. The power converter may temporarily operate abnormally, such as generating a driving voltage of a low level that is insufficient for the display panel to be normally driven. In this case, luminance of the display panel may be deteriorated, or the display panel must be shutdown to prevent malfunction of the display panel. The malfunction or shutdown of the display panel may be particularly problematic when the display panel is installed in a vehicle or the like, as there may be an issue related to the safety of a driver.

SUMMARY

An exemplary embodiment of the present invention provides a power supply device in which, when a power converter for supplying a driving voltage to a display panel operates abnormally, it is possible for the power converter to stop supplying the driving voltage and for a sub-power unit to supply a sub-driving voltage to the display panel, thereby preventing a shut-down of the display panel. Embodiments of the present invention also provide for a display device that includes the power supply device and a power supply method.

In addition, an exemplary embodiment of the present invention provides a power supply device in which includes a sub-power unit that is configured to transmit a control signal for restarting the power converter. After restarting, the power converter may resume operating normally. When the power converter operates normally after the restart, it is possible for the sub-power unit to stop supplying a sub-driving voltage and for the power converter to restart supplying a driving voltage, thereby allowing the display panel to receive the driving voltage again normally when the power converter operates normally.

In addition, an exemplary embodiment of the present invention provides a power supply device in which, when a power converter keeps operating abnormally despite a restart, it is possible for a sub-power unit to keep supplying a sub-driving voltage and for a power converter to keep stopping supplying a driving voltage, thereby continuously displaying an image without shut-down of the display panel. Embodiments of the present invention also provide for a display device that includes the power supply device and a power supply method.

A power supply device according to an exemplary embodiment of the present invention includes a power converter configured to supply a driving voltage to a display panel; and a sub-power unit configured to supply a sub-driving voltage to the display panel when the power converter operates abnormally.

According to another exemplary embodiment of the present invention, the power converter may be configured to stop supplying the driving voltage to the display panel and to transmit a first control signal to the sub-power unit when the power converter operates abnormally, and the sub-power unit may be configured to supply the sub-driving voltage to the display panel in response to the first control signal.

According to another exemplary embodiment of the present invention, the power converter is configured to determine that the power converter is operating abnormally when a magnitude of the driving voltage is less than a magnitude of a reference driving voltage or a magnitude of a driving current is greater than a magnitude of a reference driving current.

According to another exemplary embodiment of the present invention, the sub-power unit may be configured to transmit a second control signal for restarting the power converter to the power converter, and the power converter may be configured to restart in response to the second control signal.

According to another exemplary embodiment of the present invention, the sub-power unit may be configured to stop supplying the sub-driving voltage to the display panel when the power converter operates normally through the restart, and the power converter may be configured to supply the driving voltage to the display panel.

According to another exemplary embodiment of the present invention, the power converter may be configured to not supply the driving voltage to the display panel when the power converter keeps operating abnormally after the restart, and the sub-power unit may be configured to keep supplying the sub-driving voltage to the display panel.

According to another exemplary embodiment of the present invention, the sub-power unit may be a timing controller embedded driver (TED) that controls an operation of the display panel.

According to another exemplary embodiment of the present invention, the sub-power unit may include at least one charge pump.

According to another exemplary embodiment of the present invention, the power converter may generate the driving voltage based on a first input voltage, the sub-power unit may generate the sub-driving voltage based on a second input voltage, a magnitude of the second input voltage may be less than a magnitude of the first input voltage, and a magnitude of the sub-driving voltage may be the same as a magnitude of the driving voltage.

According to another exemplary embodiment of the present invention, the sub-power unit may be configured to supply the sub-driving voltage to the display panel after at least one scan time elapses when the power converter operates abnormally.

A display device according to an exemplary embodiment of the present invention includes a display panel configured to display an image; and a power supply device configured to supply a driving voltage or a sub-driving voltage to the display panel, wherein the power supply device includes a power converter configured to supply the driving voltage to the display panel; and a sub-power unit configured to supply a sub-driving voltage to the display panel when the power converter operates abnormally.

According to another exemplary embodiment of the present invention, the power converter may be configured to stop supplying the driving voltage to the display panel and to transmit a first control signal to the sub-power unit when the power converter operates abnormally, and the sub-power unit may be configured to supply the sub-driving voltage to the display panel in response to the first control signal.

According to another exemplary embodiment of the present invention, the sub-power unit may be configured to transmit a second control signal that restarts the power converter to the power converter, and the power converter may be configured to be restarted in response to the second control signal.

According to another exemplary embodiment of the present invention, the sub-power unit may be configured to stop supplying the sub-driving voltage to the display panel when the power converter operates normally after the restart, and the power converter may be configured to supply the driving voltage to the display panel, and the power converter may be configured to continue stopping supplying the driving voltage to the display panel when the power converter keeps operating abnormally after the restart, and the sub-power unit may be configured to keep supplying the sub-driving voltage to the display panel.

A power supply method according to an exemplary embodiment of the present invention includes supplying, by a power converter, a driving voltage for driving a display panel to the display panel; determining, by the power converter, whether the power converter is operating abnormally; stopping, by the power converter, the supplying of the driving voltage to the display panel when the power converter is determined to be operating abnormally; and supplying, by the sub-power unit, a sub-driving voltage for driving the display panel to the display panel.

According to another exemplary embodiment of the present invention, the stopping, by the power converter, the supplying of the driving voltage to the display panel may further include transmitting, by the power converter, a first control signal to the sub-power unit, and the supplying, by the sub-power unit, the sub-driving voltage to the display panel may be performed based on the first control signal.

According to another exemplary embodiment of the present invention, the power supply method may further include transmitting, by the sub-power unit, a second control signal that restarts the power converter to the power converter; and restarting the power converter in response to the second control signal.

According to another exemplary embodiment of the present invention, the power supply method may further include, stopping, by the sub-power unit, supplying the sub-driving voltage to the display panel and supplying, by the power converter, the driving voltage to the display panel, when the power converter operates normally after the restart.

According to another exemplary embodiment of the present invention, the power supply method may further include, continuing, by the power converter, the stopping of supplying the driving voltage to the display panel, and continuing, by the sub-power unit, the supplying of the sub-driving voltage to the display panel, when the power converter continues operating abnormally after the restart.

A power supply device, a display device including the same, and the power supply method according to an exemplary embodiment of the present invention may display an image without shutdown of the display panel even though the power converter operates abnormally.

In addition, a power supply device, a display device including the same, and a power supply method according to the exemplary embodiments of the present invention allow the power converter instead of the sub-power unit to supply again the driving voltage to the display panel, when the power converter operates normally again, thereby allowing the display panel to display an image by a relatively high driving voltage.

In addition, when the display panel is installed in a vehicle or the like, the display panel may display an image without shutdown, thereby improving a safety of a driver.

BRIEF DESCRIPTION OF THE DRAWINGS

FIG. 4 is a flowchart for illustrating a power supply method according to another exemplary embodiment of the present invention.

DETAILED DESCRIPTION OF THE EMBODIMENTS

Figure 1:
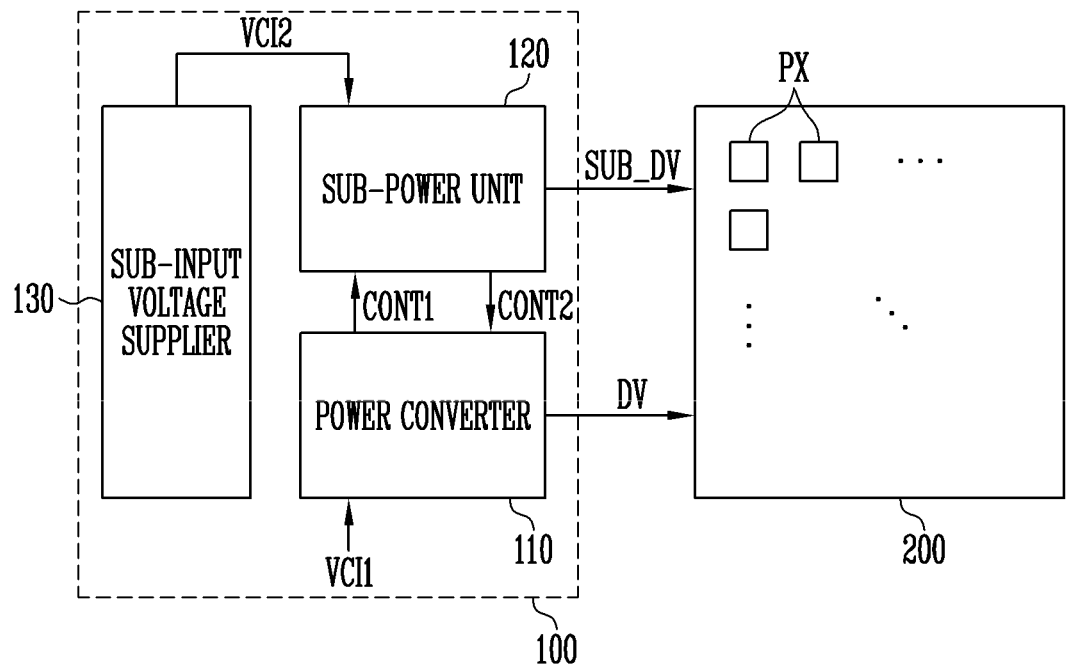
FIG. 1 is a schematic view for illustrating a power supply device according to an exemplary embodiment of the present invention.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "on," "connected to," or "coupled to" another element or layer, it can be directly on, connected to, or coupled to the other element or layer, or one or more intervening elements or layers may be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The power supply device or power supply devices and/or any other relevant devices or components for supplying power to a display device may be implemented utilizing any suitable hardware, firmware (e.g., an application-specific integrated circuit), software, or a combination of software, firmware, and hardware. For example, the power supply device may include a power converter, a sub-power unit and a sub-input voltage supplier. A display panel may include a plurality of pixels, a scan driver, a data driver, and a timing controller, according to embodiments of the present invention described herein. The power supply device may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a schematic view for illustrating a power supply device according to an exemplary embodiment of the present invention.

Referring to FIG. 1, a power supply device 100 generates a driving voltage DV and a sub-driving voltage SUB_DV for driving a display panel 200, and transmits them to the display panel 200. The power supply device 100 includes a power converter 110, a sub-power unit 120, and a sub-input voltage supplier 130.

The power converter 110 of the power supply device 100 is configured to generate the driving voltage DV and to supply the driving voltage DV to the display panel 200. The power converter 110 may convert a first input voltage VCI1 supplied from an external source to the driving voltage DV, and may transmit the generated driving voltage DV to the display panel 200 through a driving voltage line. The driving voltage DV may include a first driving voltage and a second driving voltage. For example, the first driving voltage may be a high-potential driving voltage that is greater than the second driving voltage, and may be applied to the display panel 200 through a first driving voltage line. In addition, the second driving voltage may be a low-potential driving voltage, and may be applied to the display panel 200 through a second driving voltage line.

The power converter 110 may be configured to determine whether the power converter 110 operates abnormally, and when the power converter 110 operates abnormally, the power converter 110 may transmit a first control signal CONT1 to the sub-power unit 120 and stop supplying the driving voltage DV to the display panel 200.

An abnormal operation of the power converter 110 may be a case where an abnormality occurs in the driving voltage DV generated by the power converter 110 and supplied to the display panel 200. For example, when a magnitude of the driving voltage DV generated by the power converter 110 is out of a normal range, or when a magnitude of a driving current flowing in a driving voltage line transmitting the driving voltage DV on the display panel 200 is out of a normal range, it may be determined that an abnormal operation is occurring in the power converter 110.

For example, when the magnitude of the driving voltage DV applied to the driving voltage line is less than a magnitude of a reference driving voltage, the power converter 110 may be determined to be operating abnormally. For example, the magnitude of the reference driving voltage may be 80% of the magnitude of the driving voltage that allows the display panel 200 to operate normally (e.g., to normally display an image). For example, when a magnitude of the first driving voltage or the second driving voltage applied respectively to the first driving voltage line or the second driving voltage line is less than the magnitude of the reference driving voltage, the power converter 110 may be determined to be operating abnormally.

Similarly, when the magnitude of the driving current flowing in the driving voltage line is greater than the magnitude of a reference driving current, the power converter 110 may be determined to be operating abnormally. The magnitude of the reference driving current may be the maximum magnitude of the driving current that allows the display panel 200 to operate normally. When the magnitude of the driving current is greater than the reference driving current magnitude, the power converter 110 may be determined to be operating abnormally.

The power converter 110 may receive a second control signal CONT2 for restarting the power converter 110 from the sub-power unit 120, and may restart in response to the second control signal CONT2. When the power converter 110 operates normally through a restart (e.g., operates normally after restarting), the power converter 110 can supply the driving voltage DV to the display panel 200 again. However, when the power converter 110 does not operate normally through a restart and keeps operating abnormally, the power converter 110 can continue to be prevented from supplying the driving voltage DV.

The sub-power unit 120 of the power supply device 100 may control the overall operation of the display panel 200 and supply an additional sub-driving voltage SUB_DV to the display panel 200. For example, the sub-power unit 120 may be configured as a timing controller embedded driver (TED).

When the power converter 110 operates abnormally, the sub-power unit 120 may supply a sub-driving voltage SUB_DV of the same magnitude as the driving voltage DV to the display panel 200 instead of the power converter 110. The sub-power unit 120 may drive the display panel 200 in a low-power mode or the like, and thus power consumption may be reduced.

The sub-power unit 120 may convert the second input voltage VCI2 supplied from the sub-input voltage supplier 130 to a sub-driving voltage SUB_DV. When receiving the first control signal CONT1 from the power converter 110, the sub-power unit 120 may transmit a sub-driving voltage SUB_DV to the display panel 200 in response thereto, and thus the display panel 200 may be driven in the low-power mode.

The sub-power unit 120 may transmit a second control signal CONT2 causing the power converter 110 to restart to the power converter 110. When the power converter 110 resumes operating normally (e.g., by restarting), the sub-power unit 120 may stop supplying the sub-driving voltage SUB_DV to the display panel 200. The sub-power unit 120 may include at least one charge pump. The charge pump outputs a reverse voltage or a boosted voltage using a principle of accumulating electricity of a condenser (e.g., a capacitor). The sub-power unit 120 may generate the sub-driving voltage SUB_DV using at least one charge pump.

The sub-input voltage supplier 130 of the power supply device 100 supplies the second input voltage VCI2 to the sub-power unit 120. The sub-input voltage supplier 130 may generate the second input voltage VCI2 with a magnitude that is less than the first input voltage VCI1 and supply the second input voltage VCI2 to the sub-power unit 120. The power supply device 100 may include the sub-input voltage supplier 130, but is not limited thereto, and may receive a second input voltage VCI2 from a separate external voltage source.

The display panel 200 is configured for displaying an image. The display panel 200 may include a plurality of pixels PX, the minimum unit for emitting light. Each pixel PX may include at least one of red pixel, green pixel and blue pixel. A display element (e.g., an organic light emitting display (OLED) element) and a driving element for driving a display element may be disposed in each pixel PX. The driving element may be implemented as a thin film transistor, and a thin film transistor may be connected to a signal line, that is, a gate line and a data line.

Although not specifically shown in FIG. 1, a plurality of signal lines may be disposed in the display panel 200. A plurality of signal lines may include a plurality of data lines and a plurality of gate lines. A plurality of data lines extend in a first direction (e.g., a vertical direction) to transmit the data signal to the thin film transistor, and a plurality of gate lines extend in a second direction crossing the first direction (e.g., a horizontal direction) to transmit the gate signal to the thin film transistor. The first direction and the second direction may be perpendicular to each other, but are not limited thereto.

Figure 2:
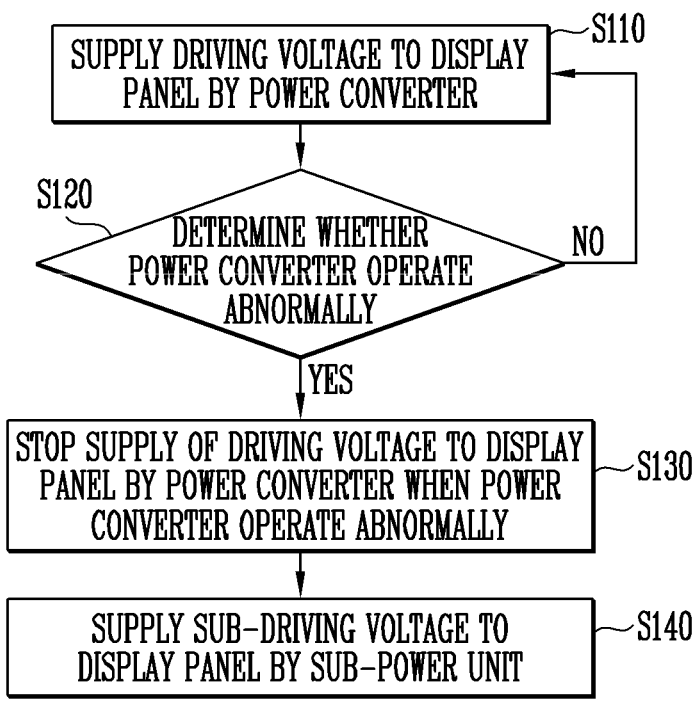
FIG. 2 is a flowchart for illustrating a power supply method according to an exemplary embodiment of the present invention.
Figure 3A:
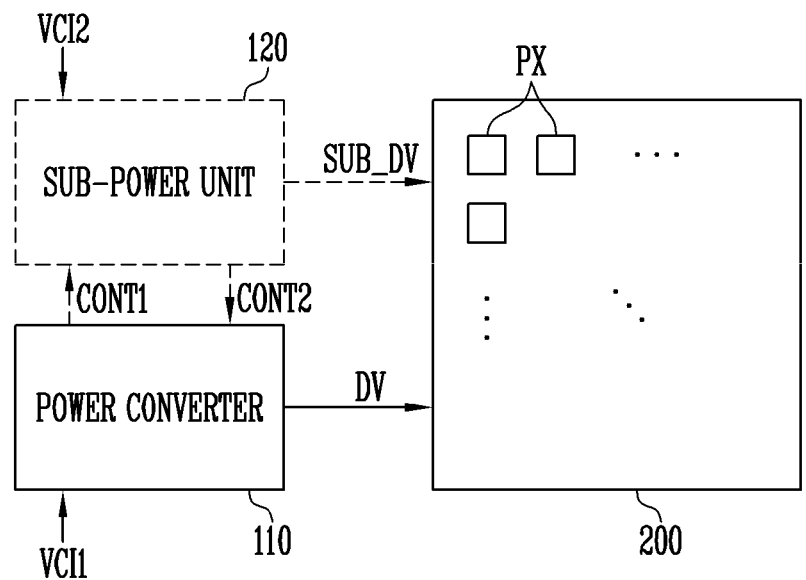
FIGS. 3A and 3B are schematic views for illustrating a power supply method according to an exemplary embodiment of the present invention.
Figure 3B:
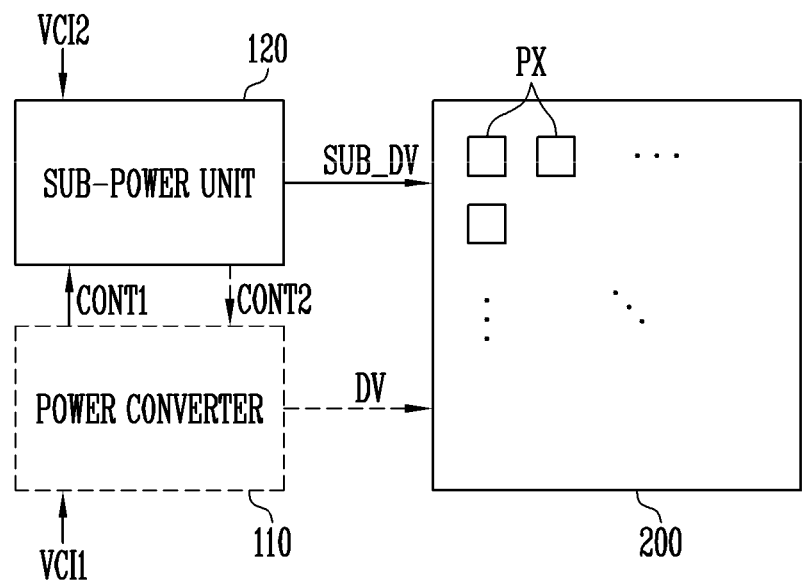

FIG. 2 is a flowchart for illustrating a power supply method according to an exemplary embodiment of the present invention. FIGS. 3A and 3B are schematic views for illustrating a power supply method according to an exemplary embodiment of the present invention. Because the power converter 110, the sub-power unit 120, and the display panel 200 of FIGS. 3A and 3B are substantially the same as the power converter 110, the sub-power unit 120, and the display panel 200 of FIG. 1, duplicate descriptions may be omitted.

Referring to FIGS. 2 and 3A, the power converter 110 supplies the driving voltage DV to the display panel 200 (S110). The power converter 110 generates a driving voltage DV for driving the display panel 200 based on the first input voltage VCI1. The generated driving voltage DV may be supplied to the display panel 200 through the driving voltage line. The driving voltage DV may include the first driving voltage, which is a high-potential driving voltage, and the second driving voltage, which is a low-potential driving voltage DV. The first driving voltage may be supplied to the display panel 200 through the first driving voltage line, and the second driving voltage may be supplied to the display panel 200 through the second driving voltage line. While the power converter 110 supplies the driving voltage DV to the display panel 200, the sub-power unit 120 may not supply the sub-driving voltage SUB_DV to the display panel 200. The display panel 200 may be driven by the driving voltage DV to display an image.

Next, the power converter 110 determines whether an abnormal operation has occurred (S120). The power converter 110 may determine occurrences of the abnormal operation by measuring a magnitude of the driving voltage DV applied to the driving voltage line or a magnitude of a driving current flowing through the driving voltage line. The power converter 110 may determine that the abnormal operation has occurred when the magnitude of the driving voltage DV is less than the magnitude of the reference driving voltage, or when the magnitude of the driving current is greater than the magnitude of the reference driving current.

During normal operation (e.g., when the abnormal operation does not occur), the power converter 110 may supply the driving voltage DV to the display panel 200. When the power converter 110 supplies the driving voltage DV to the display panel 200, the sub-power unit 120 may not supply the sub-driving voltage SUB_DV to the display panel 200.

Alternatively, referring to FIG. 3B, when an abnormal operation occurs, the power converter 110 stops supplying the driving voltage DV to the display panel 200 (S130).

Next, the sub-power unit 120 supplies the sub-driving voltage SUB_DV to the display panel 200 (S140). The power converter 110 may transmit the first control signal CONT1 to the sub-power unit 120 when it determines that the abnormal operation has occurred. The sub-power unit 120 may transmit the sub-driving voltage SUB_DV to the display panel 200 in response to receiving the first control signal CONT1. The sub-driving voltage SUB_DV may include a first sub-driving voltage, which is a high-potential sub-driving voltage, and a second sub-driving voltage, which is a low-potential sub-driving voltage. The sub-power unit 120 may supply the first sub-driving voltage to the display panel 200 through the first driving voltage line and the second sub-driving voltage to the display panel 200 through the second driving voltage line. While the sub-power unit 120 supplies the sub-driving voltage SUB_DV to the display panel 200, the power converter 110 may not supply the driving voltage DV to the display panel 200.

According to an exemplary embodiment of the present invention, the power supply device 100 allows the power converter 110 to stop the supply of the driving voltage DV and for the sub-power unit 120 to transmit the sub-driving voltage SUB_DV to the display panel 200, when the abnormal operation occurs in the power converter 110. When the power converter 110 stops the supply of the driving voltage DV, the power converter 110 may transmit the first control signal CONT1 to the sub-power unit 120, and in response to the first control signal CONT1, the sub-power unit 120 may transmit the sub-driving voltage SUB_DV having the same magnitude as the drive voltage DV to the display panel 200. Accordingly, the display panel 200 may be driven in a low-power mode and display an image using the sub-driving voltage SUB_DV supplied from the sub-power unit 120. Accordingly, the display panel 200 may continue displaying the image without interruption (e.g., due to the display shutting down) even when the power converter 110 stops supplying the driving voltage DV (e.g., because the power converter 110 is behaving abnormally).

For example, when the display panel 200 is installed in a vehicle or the like, a shutdown of the display panel 200 may contribute to or cause an accident during driving of the vehicle. When the abnormal operation occurs in the power converter 110 (e.g., while the display panel 200 is installed on the vehicle or the like), the sub-power unit 120 of the power supply device 100 may supply the sub-driving voltage SUB_DV to the display panel 200. Accordingly, the display panel 200 installed on a vehicle or the like may display (e.g., continuously display) an image without interruption (e.g., without shutting down), and the safety of the driver may be maintained.

Figure 5A:
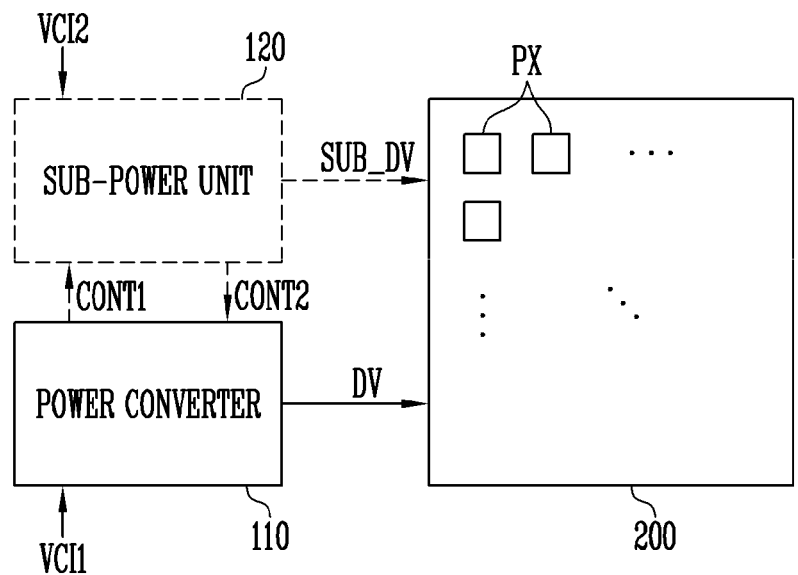
FIGS. 5A-5C are schematic views for illustrating a power supply method according to another exemplary embodiment of the present invention.
Figure 5B:
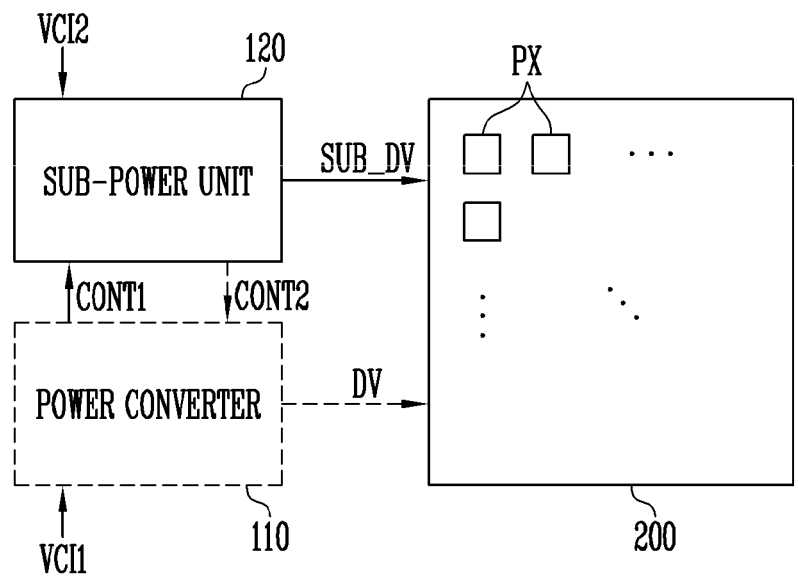
Figure 5C:
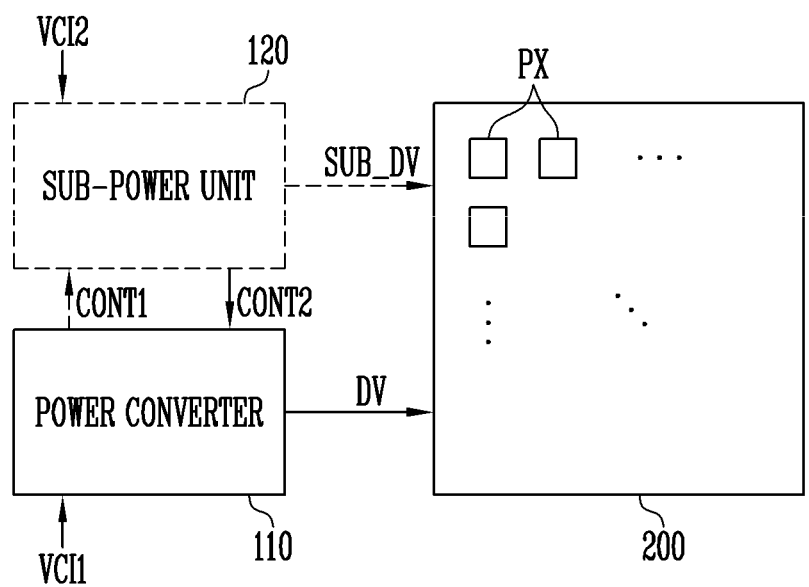

FIG. 4 is a flowchart for illustrating a power supply method according to another exemplary embodiment of the present invention. FIGS. 5A-5C are schematic views for illustrating a power supply method according to another exemplary embodiment of the present invention. Because the power converter 110, the sub-power unit 120, and the display panel 200 of FIGS. 5A-5C is substantially the same as the power converter 110, the sub-power unit 120, and the display panel 200 of FIG. 1, duplicate descriptions may be omitted.

First, referring to FIGS. 4 and 5A, the power converter 110 supplies the driving voltage DV to the display panel 200 (S110). Next, the power converter 110 determines whether an abnormal operation has occurred (S120). Because the steps S110 and S120 for the power converter 110 to supply the driving voltage DV to the display panel 200 and to determine whether an abnormal operation has occurred are substantially the same as the steps S110 and S120 described in FIGS. 2 and 3A, duplicate descriptions have been omitted.

The power converter 110 may continue supplying the driving voltage DV to the display panel 200 when the abnormal operation does not occur.

Alternatively, referring to FIG. 5B, the power converter 110 stops the supply of the driving voltage DV to the display panel 200 when an abnormal operation occurs. Next, the sub-power unit 120 supplies the sub-driving voltage SUB_DV to the display panel 200 (S140). Because these steps S130 and S140 are substantially the same as the steps S130 and S140 described in FIGS. 2 and 3B, duplicate descriptions may be omitted.

Next, referring to FIG. 5C, the sub-power unit 120 transmits the second control signal CONT2 to the power converter 110 (S250). The second control signal CONT2 may be a toggle signal that restarts the power converter 110. For example, the sub-power unit 120 may periodically transmit the second control signal CONT2 to the power converter 110 while supplying a sub-driving voltage SUB_DV to the display panel 200.

Next, the power converter 110 restarts in response to the second control signal CONT2 (S260). After restarting, the power converter 110 may generate the driving voltage DV.

When the power converter 110 operates normally, the power converter 110 may resume supplying the driving voltage DV to the display panel 200 (S270). The power converter 110 restarts in response to the second control signal CONT2. After restarting, the power converter 110 resumes generating the driving voltage DV. When the magnitude of the driving voltage DV generated by the power converter 110 is greater than the magnitude of the reference driving voltage, and/or the magnitude of the driving current flowing in the driving voltage line is less than the magnitude of the reference driving current, the power converter 110 may be determined to be operating normally and then may resume (e.g., restart) the supply of driving voltage DV to the display panel 200 through the driving voltage line.

After restarting the power converter, the sub-power unit 120 stops supplying the sub-driving voltage SUB_DV to the display panel 200 (S280) when the power converter 110 has resumed operating normally after restarting (e.g., when the driving voltage DV is normally supplied to the display panel 200, the sub-power unit 120 may stop supplying the sub-driving voltage SUB_DV to the display panel 200). Accordingly, the display panel 200 may be driven by the power converter 110 rather than the sub-power unit 120.

In some embodiments, when the power converter 110 continues operating abnormally after a restart, the power converter 110 continues to prevent the supply of the driving voltage DV to the display panel 200 (S290). The power converter 110 may be restarted by the second control signal CONT2 and again generate the driving voltage DV. However, the magnitude of the driving voltage DV may be less than the magnitude of the reference driving voltage or the magnitude of the driving current may be greater than the magnitude of the reference driving current despite the restart of the power converter 110. Thus, when the power converter 110 keeps operating abnormally, the power converter 110 may continue to prevent (e.g., keep stopping) the supply of the driving voltage DV.

Next, the sub-power unit 120 keeps supplying the sub-driving voltage SUB_DV to the display panel 200 (S300). When the power converter 110 keeps operating abnormally despite the restart, the sub-power unit 120 may continue to supply the sub-driving voltage SUB_DV to the display panel 200. Accordingly, the display panel 200 may be driven using the sub-driving voltage SUB_DV.

In a power supply device 100 and a power supply method according to another exemplary embodiment of the present invention, the sub-power unit 120 may transmit the second control signal CONT2 causing a restart of the power converter 110 to the power converter 110. When the power converter 110 operates normally after (e.g., through) the restart, the sub-power unit 120 may stop supplying the sub-driving voltage SUB_DV, and the display panel 200 may be driven using the driving voltage DV supplied from the power converter 110. When the power converter 110 keeps operating abnormally despite the restart, the display panel 200 may be driven using the sub-driving voltage SUB_DV supplied from the sub-power unit 120. Accordingly, the display panel 200 may keep displaying an image in a low-power mode without shutting down even when the power converter 110 operates abnormally. The display panel 200 may be driven by the power converter 110 when the power converter 110 restarts the normal operation.

Figure 6:
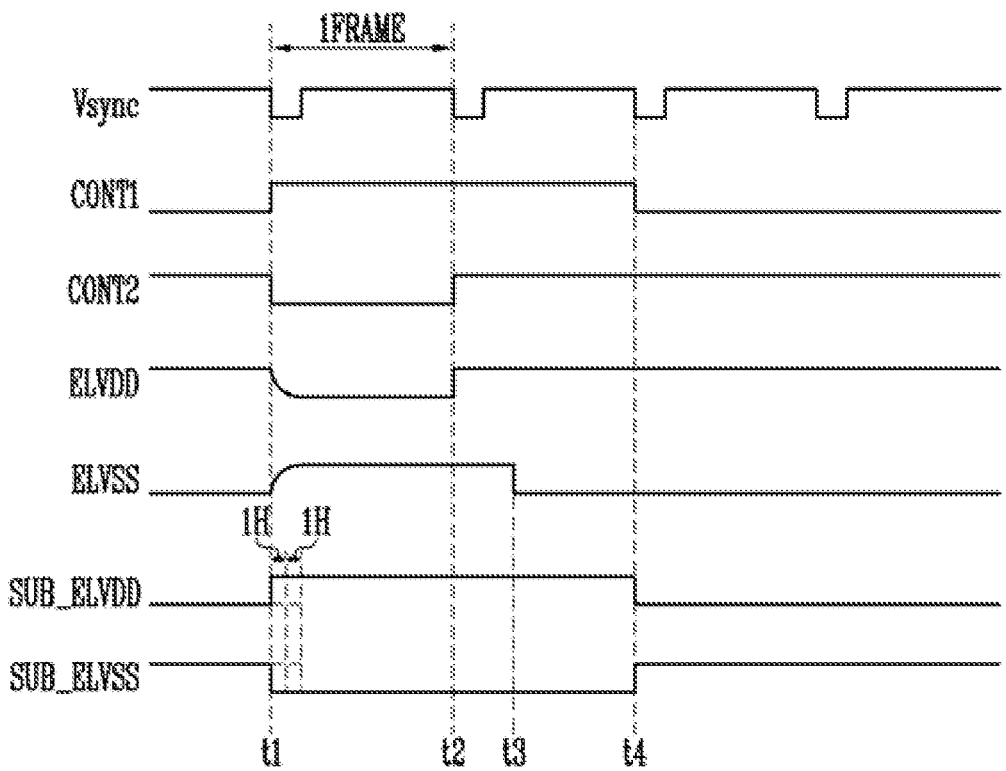
FIG. 6 is a timing diagram for illustrating a driving method of a power supply device according to an exemplary embodiment of the present invention.

FIG. 6 is a timing diagram for illustrating a driving method of a power supply device according to an exemplary embodiment of the present invention. For convenience of description, FIG. 6 will be described with reference to FIGS. 4-5C.

Referring to FIG. 6, the timing diagram of a vertical synchronization signal Vsync, a first control signal CONT1, a second control signal CONT2, a first driving voltage ELVDD, a second driving voltage ELVSS, a first sub-driving voltage SUB_ELVDD, and a second sub-driving voltage SUB_ELVSS are shown. The vertical synchronization signal Vsync is shown as a reference signal for timing. An interval between pulses of the vertical synchronization signal Vsync may be one horizontal cycle 1FRAME.

The power converter 110 may normally supply the driving voltage DV to the display panel 200 in a time period before a first time point t1. For example, the power converter 110 may supply the first driving voltage ELVDD at a high level and the second driving voltage ELVSS at a low level to the display panel 200 through a driving voltage line. At this time (e.g., when the power converter 110 is supplying the first driving voltage and the second driving voltage), the sub-power unit 120 may not transmit the first sub-driving voltage SUB_ELVDD at a low level and the second sub-driving voltage SUB_ELVSS at a high level to the display panel 200.

At the first time point t1, the power converter 110 may start an abnormal operation. For example, the first driving voltage ELVDD at a high level may become a low level and the second driving voltage ELVSS at a low level may become a high level. The power converter 110 may not provide the first driving voltage ELVDD at the low level and/or the second driving voltage ELVSS at the high level to the display panel 200. In addition, the power converter 110 may change the first control signal CONT1 from a low level to a high level and transmit the first control signal CONT1 (e.g., when it is at a high level) to the sub-power unit 120.

The sub-power unit 120 may supply the sub-driving voltage SUB_DV to the display panel 200 in response to the first control signal CONT1 (e.g., when the first control signal CONT1 becomes a high level). For example, the first sub-driving voltage SUB_ELVDD which begins at a low level may become a high level, and the second sub-driving voltage SUB_ELVSS which begins at a high level may become a low level. The first sub-driving voltage SUB_ELVDD (e.g., which is at a high level) and the second sub-driving voltage SUB_ELVSS (e.g., which is at a low level) may be supplied to the display panel 200.

At a second time point t2, the second control signal CONT2 is changed from a low level to a high level. The sub-power unit 120 may transmit the second control signal CONT2 at a high level to the power converter 110, and the power converter 110 may restart. The power converter 110 restarts so that the first driving voltage ELVDD may be changed from a low level to a high level. At a third time point t3, the second driving voltage ELVSS is changed from a high level to a low level.

At a fourth time point t4, the sub-power unit 120 changes the first sub-driving voltage SUB_ELVDD from a high level to a low level and the second sub-driving voltage SUB_ELVSS from a low level to a high level. The sub-power unit 120 stops supplying the sub-driving voltage SUB_DV (e.g., the first sub-driving voltage SUB_ELVDD and the second sub-driving voltage SUB_ELVSS) to the display panel 200. The power converter 110 supplies the first driving voltage ELVDD at a high level and the second driving voltage ELVSS at a low level to the display panel 200. Accordingly, the display panel 200 may be driven by the first driving voltage ELVDD and the second driving voltage ELVSS supplied from the power converter 110 rather than the sub-power unit 120 at the fourth time point t4.

Meanwhile, the sub-power unit 120 may supply the sub-driving voltage SUB_DV to the display panel 200 after at least one scan time H has elapsed from the first time point t1 when the power converter 110 starts the abnormal operation. The scan time H may refer to a time interval from the time when a gate signal is applied through one gate line to the time when the next gate signal is applied through an adjacent gate line. For example, the sub-power unit 120 changes the first sub-driving voltage SUB_ELVDD from a low level to a high level and the second sub-driving voltage SUB_ELVSS from a high level to a low level at a time point when one scan time 1H is delayed from the first time point t1 when the power converter 110 starts the abnormal operation. Alternatively, the sub-power unit 120 may change the first sub-driving voltage SUB_ELVDD from a low level to a high level and the second sub-driving voltage SUB_ELVSS from a high level to a low level at a time point when two scan time 2H are delayed from the first time point t1. When the sub-driving voltage SUB_DV is supplied from the sub-power unit 120 to the display panel 200 (e.g., at a time point when at least one scan time H is delayed from the first time point t1 when the power converter 110 starts the abnormal operation), an image displayed in the display panel may be displayed more naturally. Therefore, a time point supplying the sub-driving voltage SUB_DV can be controlled by the number of the scan times H that are delayed with respect to the first time point t1, so that a natural image may be displayed when changing a voltage supplied from the driving voltage DV to the sub-driving voltage SUB_DV.

Figure 7:
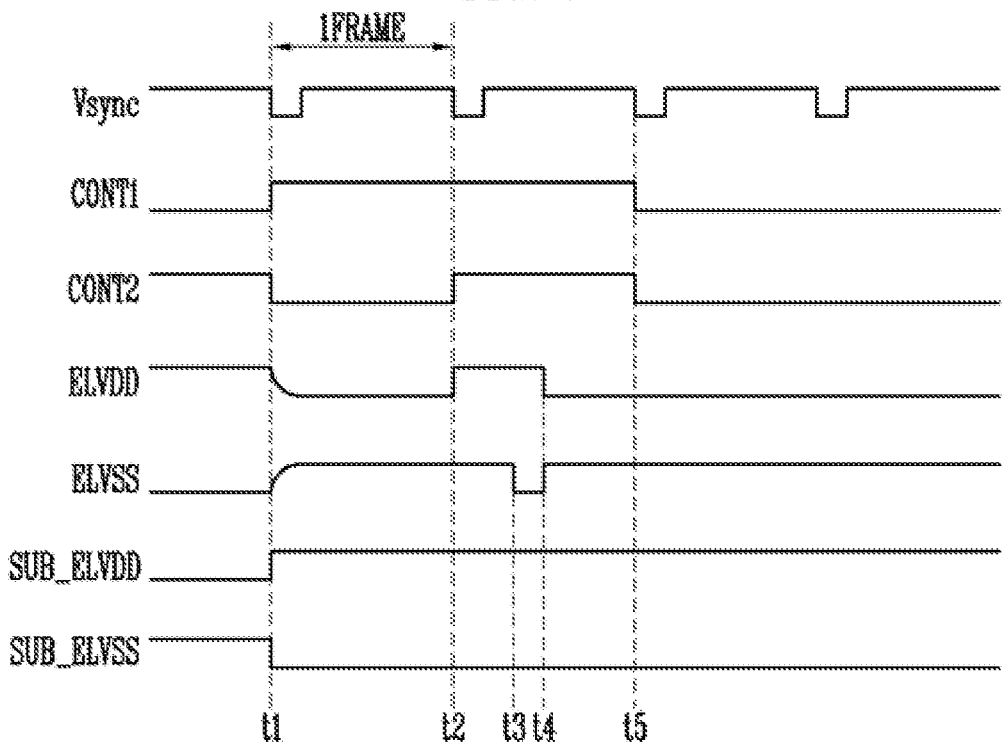
FIG. 7 is a timing diagram for illustrating a driving method of a power supply device according to an exemplary embodiment of the present invention.

FIG. 7 is a timing diagram for illustrating a driving method of a power supply device according to an exemplary embodiment of the present invention. Because the timing diagram of FIG. 7 is substantially the same as the timing diagram of FIG. 6 except that the driving after the third time point t3 is different from each other, duplicate descriptions may be omitted. For convenience of description, FIG. 7 will be described with reference to FIGS. 4-6.

Referring to FIG. 7, the power converter 110 may normally supply the driving voltage DV to the display panel 200 in a time period before the first time point t1. For example, the power converter 110 may supply the first driving voltage ELVDD at a high level and the second driving voltage ELVSS at a low level to the display panel 200 through the driving voltage line. At this time, the sub-voltage unit 120 may not transmit the first sub-driving voltage SUB_ELVDD (e.g., at a high level) and the second sub-driving voltage SUB_ELVSS (e.g., at a low level) to the display panel 200.

At the first time point t1, the power converter 110 may start an abnormal operation. For example, the first driving voltage ELVDD may begin at a high level and may become a low level, and the second driving voltage ELVSS may begin at a low level may and become a high level. The power converter 110 may not provide the first driving voltage ELVDD at the low level and the second driving voltage ELVSS at the high level to the display panel 200. The power converter 110 may change the first control signal CONT1 from a low level to a high level and transmit the first control signal CONT1 at the high level to the sub-power unit 120.

The sub-power unit 120 may supply the sub-driving voltage SUB_DV to the display panel 200 in response to the first control signal CONT1. For example, the first sub-driving voltage SUB_ELVDD at a high level may become a low level, and the second sub-driving voltage SUB_ELVSS at a low level may become a high level. The first sub-driving voltage SUB_ELVDD at a low level and the second sub-driving voltage SUB_ELVSS at a high level may be supplied to the display panel 200.

At the second time point t2, the second control signal CONT2 is changed from a low level to a high level. The sub-power unit 120 may transmit the second control signal CONT2 at a high level to the power converter 110, and the power converter 110 may restart. The power converter 110 restarts so that the first driving voltage ELVDD may be changed from the low level to a high level. At the third time point t3, the second driving voltage ELVSS is changed from a high level to a low level.

At the fourth time point t4, the power converter 110 continues operating abnormally despite the restart. For example, the first driving voltage ELVDD, which was changed to the high level at the second time point t2, is changed to a low level at the fourth time point t4. Then, the second driving voltage ELVSS, which was changed to the low level to the third time point t3, is changed to a high level at the fourth time point t4.

At a fifth time point t5, the first driving voltage ELVDD stays at the low level and the second driving voltage ELVSS stays at the high level. Accordingly, the first sub-driving voltage SUB_ELVDD maintains a low level and the second sub-driving voltage SUB_ELVSS maintains the high level. The sub-power unit 120 may continue supplying the first sub-driving voltage SUB_ELVDD at the low level and the second sub-driving voltage SUB_ELVSS at the high level to the display panel 200. In addition, the power converter 110 may continue to prevent (e.g., keep stopping) the supply of the first driving voltage ELVDD and the second driving voltage ELVSS.

Figure 8:
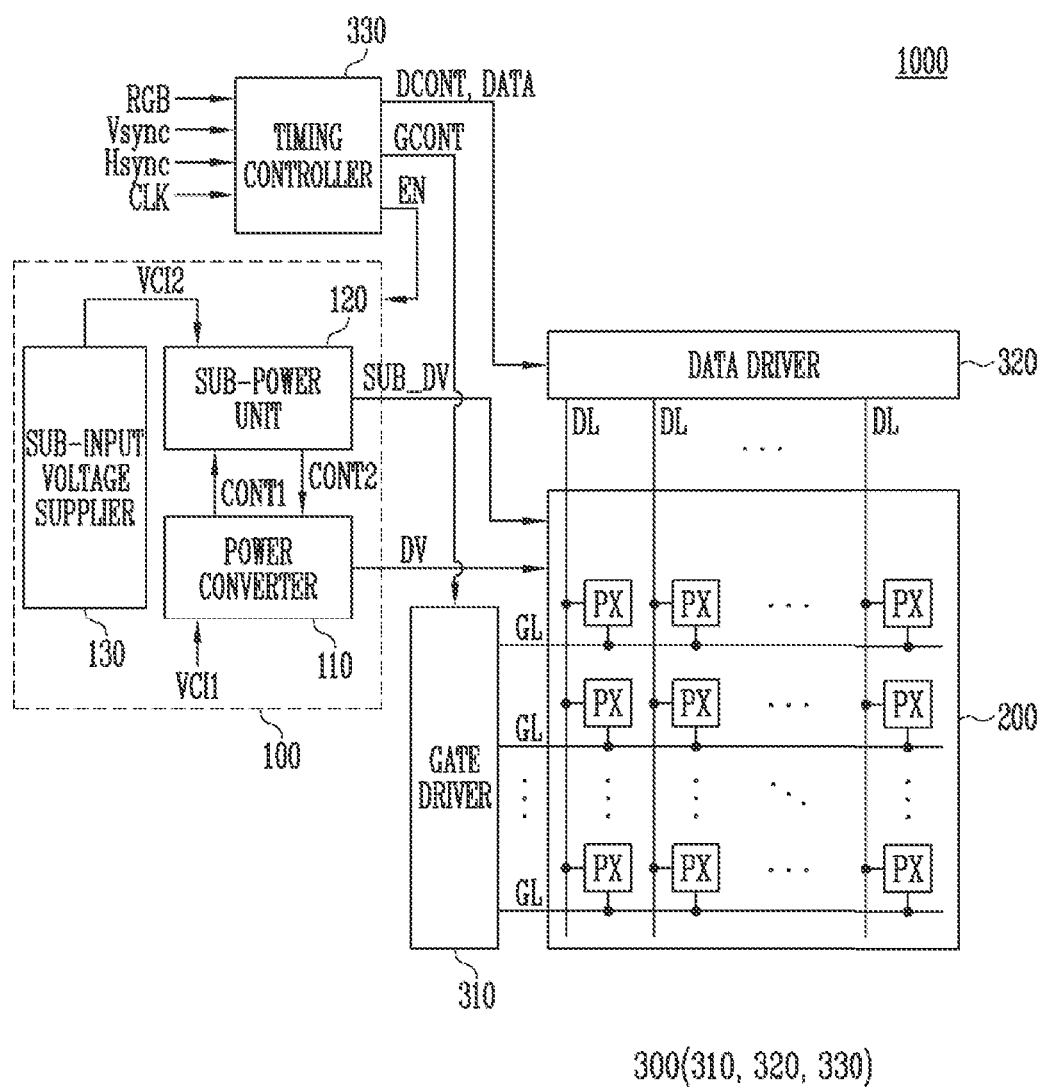
FIG. 8 is a schematic view for illustrating a display device according to an exemplary embodiment of the present invention.

FIG. 8 is a schematic view for illustrating a display device according to an exemplary embodiment of the present invention. Because a power supply device 100 and a display panel 200 of FIG. 8 are substantially the same as the power supply device 100 and the display panel 200 of FIG. 1, duplicate descriptions may be omitted.

Referring to FIG. 8, a display device 1000 includes a power supply device 100, a display panel 200, and a driver 300. The power supply device 100 may transmit the driving voltage DV or the sub-driving voltage SUB_DV to each of a plurality of pixels PX of the display panel 200 through the driving voltage line. A power converter 110 of the power supply device 100 generates the driving voltage DV and transmits the driving voltage DV to each of a plurality of pixels PX. When the power converter 110 operates abnormally, the power converter 110 stops supplying the driving voltage DV, and the sub-power unit 120 transmits the sub-driving voltage SUB_DV to each of the plurality of pixels PX. Accordingly, the display panel 200 does not shutdown even when the power converter 110 operates abnormally, and may continue displaying the image using the sub-driving voltage SUB_DV in a low power mode.

The display panel 200 may include a plurality of pixels PX arranged in a matrix form, and a plurality of pixels PX may be connected to a plurality of gate lines GL and a plurality of data lines DL to receive gate signals and data signals (respectively) and operate.

The driver 300 includes a gate driver 310, a data driver 320, and a timing controller 330.

The timing controller 330 may receive an RGB image signal RGB, a vertical synchronization signal Vsync, a horizontal synchronization signal Hsync, a clock signal CLK, and the like from an external graphic controller, and may generate an output image signal DATA corresponding to the RGB image signal RGB, a data control signal DCONT, a gate control signal GCONT, and an enable signal EN based on these signals. The timing controller 330 may provide the gate control signal GCONT to the gate driver 310, provide the output image signal DATA and the data control signal DCONT to the data driver 320, and provide the enable signal to the power supply device 100.

The gate driver 310 may apply (e.g., sequentially apply) the gate signal to a plurality of gate lines GL of the display panel 200 based on the gate control signal GCONT supplied from the timing controller 330. The gate driver 310 may be disposed by a method such as a chip on glass (COG), a chip on film (COF), or a tape carrier package (TCP) according to a mounting method, but is not limited thereto.

The data driver 320 may apply the data signal to a plurality of data lines DL based on the data control signal DCONT and the output image signal DATA supplied from the timing controller 330. The data driver 320 may be disposed by a method such as a chip on glass (COG), a chip on film (COF), or a tape carrier package (TCP) according to a mounting method, but is not limited thereto.

The display device 1000 according to an exemplary embodiment of the present invention includes a power supply device 100 including a sub-power unit 120. When the power converter 110 of the power supply device 100 fails to normally transmit the driving voltage DV to the display panel 200, the power converter 110 stops supplying the driving voltage DV. In this case, the sub-power unit 120 may supply the sub-driving voltage SUB_DV to the display panel 200 instead of the power converter 110, and the display panel 200 may keep supplying the image by the sub-driving voltage SUB_DV in a low power mode. Thus, the display panel 200 may continue displaying the image without shut down. Particularly, when the display device 1000 according to an exemplary embodiment of the present invention is installed in a vehicle or the like, the safety of the driver may be secured by not shutting down when the power converter operates abnormally. In addition, the sub-power unit 120 may transmit the second control signal CONT2 for restarting the power converter 110. When the power converter 110 operates normally after the restart, the power converter 110 instead of the sub-power unit 120 may supply the driving voltage DV to the display panel 200. Accordingly, when the power converter 110 restarts and operates normally, the display panel 200 of the display device 1000 may display the image by receiving the driving voltage DV from the power converter 110.

The above-detailed description illustrates and explains the present invention. In addition, the above-detailed description merely illustrates exemplary embodiments of the present invention, the present invention may be used in various other combinations, changes, and environments as described above, and the scope of the inventive concepts disclosed herein may be changed or modified within the scope of equivalents and/or techniques or knowledge in the art. Therefore, the above-detailed description is not intended to limit the present invention to the disclosed embodiments. In addition, the appended claims should be construed to include other embodiments and their equivalents.

What is claimed is:

1. A power supply device comprising:
a power converter configured to supply a driving voltage to a display panel based on a first input voltage;
a sub-power unit configured to supply a sub-driving voltage to the display panel in response to the power converter operating abnormally, and not supply the sub-driving voltage to the display panel while the driving voltage is normally supplied to the display panel; and
a sub-input voltage supplier configured to generate a second input voltage with a magnitude that is less than the first input voltage, and to supply the second input voltage to the sub-power unit,
wherein the power converter is configured to stop supplying the driving voltage to the display panel and to transmit a first control signal to the sub-power unit in response to the power converter operating abnormally,
wherein the sub-power unit is configured to supply the sub-driving voltage to the display panel in response to the first control signal,
wherein the sub-power unit is configured to transmit a second control signal to the power converter, the second control signal for restarting the power converter, and
wherein the sub-driving voltage is generated to have a same magnitude as that of the driving voltage by converting the second input voltage.

2. The power supply device of claim 1, wherein,
the power converter is configured to determine that the power converter operates abnormally in response to a magnitude of the driving voltage being less than a magnitude of a reference driving voltage or a magnitude of a driving current being greater than a magnitude of a reference driving current.

3. The power supply device of claim 1, wherein the power converter is configured to restart in response to the second control signal.

4. The power supply device of claim 3, wherein:
the sub-power unit is configured to stop supplying the sub-driving voltage to the display panel and the power converter is configured to supply the driving voltage to the display panel, in response to the power converter operating normally after the restart.

5. The power supply device of claim 3, wherein:
the power converter is configured to not supply the driving voltage to the display panel and the sub-power unit is configured to continue supplying the sub-driving voltage to the display panel, in response to the power converter continuing to operate abnormally after the restart.

6. The power supply device of claim 1, wherein
the sub-power unit comprises a timing controller embedded driver (TED) configured to control an operation of the display panel.

7. The power supply device of claim 6, wherein
the sub-power unit comprises at least one charge pump.

8. The power supply device of claim 1, wherein
the sub-power unit is configured to supply the sub-driving voltage to the display panel after at least one scan time elapses in response to the power converter operating abnormally.

9. A display device comprising:
a display panel configured to display an image; and
a power supply device configured to supply a driving voltage or a sub-driving voltage to the display panel,
wherein the power supply device comprises:
a power converter configured to supply the driving voltage to the display panel based on a first input voltage;
a sub-power unit configured to supply a sub-driving voltage to the display panel in response to the power converter operating abnormally, and not supply the sub-driving voltage to the display panel while the driving voltage is normally supplied to the display panel; and
a sub-input voltage supplier configured to generate a second input voltage with a magnitude that is less than the first input voltage, and to supply the second input voltage to the sub-power unit,
wherein the power converter is configured to stop supplying the driving voltage to the display panel and to transmit a first control signal to the sub-power unit in response to the power converter operating abnormally,
wherein the sub-power unit is configured to supply the sub-driving voltage to the display panel in response to the first control signal,
wherein the sub-power unit is configured to transmit a second control signal to the power converter, the power converter being configured to restart in response to the second control signal, and
wherein the sub-driving voltage is generated to have a same magnitude as that of the driving voltage by converting the second input voltage.

10. The display device of claim 9, wherein the power converter is configured to restart in response to the second control signal.

11. The display device of claim 10, wherein,
the sub-power unit is configured to stop supplying the sub-driving voltage to the display panel and the power converter is configured to supply the driving voltage to the display panel, when the power converter operates normally after the restart and
the power converter is configured to not supply the driving voltage to the display panel and the sub-power unit is configured to continue supplying the sub-driving voltage to the display panel, in response to the power converter continuing to operate abnormally after the restart.

12. A power supply method comprising:
supplying, by a power converter, a driving voltage to a display panel based on a first input voltage, the driving voltage for driving the display panel;
determining, by the power converter, whether or not the power converter is operating abnormally;
stopping, by the power converter, the supplying of the driving voltage to the display panel in response to a determination that the power converter is operating abnormally;

transmitting, by the power converter, a first control signal to a sub-power unit and supplying, by the sub-power unit, a sub-driving voltage to the display panel based on the first control signal;
supplying, by a sub-input voltage supplier, a second input voltage with a magnitude that is less than the first input voltage to the sub-power unit;
supplying, by the sub-power unit, the sub-driving voltage to the display panel, the sub-driving voltage for driving the display panel; and
transmitting, by the sub-power unit, a second control signal to the power converter, the second control signal for restarting the power converter,
wherein the sub-driving voltage is generated to have a same magnitude as that of the driving voltage by converting the second input voltage, and
wherein the sub-power unit does not supply the sub-driving voltage to the display panel while the power converter normally supplies the driving voltage to the display panel.

13. The power supply method of claim 12, further comprising:
restarting the power converter in response to the second control signal.

14. The power supply method of claim 13, further comprising:
stopping, by the sub-power unit, supplying the sub-driving voltage to the display panel and supplying, by the power converter, the driving voltage to the display panel, when the power converter operates normally through the restart.

15. The power supply method of claim 13, further comprising,
determining that the power converter is operating abnormally after the restart;
stopping, by the power converter, the supply of the driving voltage to the display panel; and
supplying, by the sub-power unit, the sub-driving voltage to the display panel.

* * * * *